United States Patent [19]

Kim

[11] Patent Number: 5,299,030
[45] Date of Patent: Mar. 29, 1994

[54] IMAGE DATA PROCESSING METHOD AND APPARATUS WITH MIXTURE OF SIMPLE BINARIZATION AND PSUEDO INTERMEDIATE TONE

[75] Inventor: Eun J. Kim, Seoul, Rep. of Korea

[73] Assignee: Samsung Electronics Co. Ltd., Rep. of Korea

[21] Appl. No.: 814,967

[22] Filed: Dec. 24, 1991

[30] Foreign Application Priority Data

Oct. 30, 1991 [KR] Rep. of Korea ............ 91-19153

[51] Int. Cl.⁵ .............................................. H04N 1/40
[52] U.S. Cl. ................................... 358/462; 358/453; 358/458; 358/455; 358/448; 358/443
[58] Field of Search ............ 358/462, 453, 448, 75, 358/455, 456, 457, 458, 443

[56] References Cited

U.S. PATENT DOCUMENTS

| | | | |
|---|---|---|---|
| 4,709,274 | 11/1987 | Tanioka | 358/475 |
| 4,723,173 | 2/1988 | Tanioka | 358/457 |
| 5,001,767 | 3/1991 | Yoneda et al. | 358/462 |
| 5,014,124 | 5/1991 | Fujisawa | 358/462 |
| 5,079,638 | 1/1992 | Kishi et al. | 358/462 |
| 5,101,438 | 3/1992 | Kanda et al. | 358/462 |
| 5,128,748 | 7/1992 | Murakami et al. | 358/75 |
| 5,172,291 | 12/1991 | Sekizawa | 358/462 |

Primary Examiner—Edward L. Coles, Sr.
Assistant Examiner—Fan Lee
Attorney, Agent, or Firm—Reed Smith Shaw & McClay

[57] ABSTRACT

The present invention relates to a binary image processing method and apparatus for outputting a document image data inputted from an image input device through a binary image output device. The present invention comprises an A/D converting part for converting an analog image data signal applied from a image sensing element into a digital signal, a simple binarization processing part for transforming the image data signal applied from the A/D converting part into a simple binary image data signal, a pseudo intermediate tone processing part for transforming the image data signal applied from the A/D converting part into a binary image data signal having a gradation component, an image data coordinate system processing part for detecting the window portion of an image and outputting the control signal Cxy corresponding to the window mode select signal WMS, a data selecting part for selecting either the binary image data applied from the simple binarization processing part or the binary image data applied from the pseudo intermediate tone processing part by the control signal Cxy appiled from the image data coordinate system processing part. In processing an image comprising a text portion and a photograph portion, the present invention processes the image of the text portion with the simple binarization processing method and processes the image of the photograph portion with the pseudo intermediate tone processing method, thereby improving the picture quality of the reproduced image.

3 Claims, 10 Drawing Sheets

FIG. 8

| | m | | | | | | |
|---|---|---|---|---|---|---|---|
| 0 | 32 | 8 | 40 | 2 | 34 | 10 | 42 |
| 48 | 16 | 56 | 24 | 50 | 18 | 58 | 26 |
| 12 | 44 | 4 | 36 | 14 | 46 | 6 | 38 |
| 60 | 28 | 52 | 20 | 62 | 30 | 54 | 22 |
| 3 | 35 | 11 | 43 | 1 | 33 | 9 | 41 |
| 51 | 19 | 59 | 27 | 49 | 17 | 57 | 25 |
| 15 | 47 | 7 | 39 | 13 | 45 | 5 | 37 |
| 63 | 31 | 55 | 23 | 61 | 29 | 53 | 25 | l

IMAGE DATA PROCESSING METHOD AND APPARATUS WITH MIXTURE OF SIMPLE BINARIZATION AND PSUEDO INTERMEDIATE TONE

BACKGROUND OF THE INVENTION

The present invention relates to a binary image processing method and apparatus for outputting document image data inputted from an image input device through a binary image output device, and particularily to an image processing method and apparatus with mixture of simple binarization and pseudo intermediate tone for entirely obtaining an image of high quality by processing the letter portion of image data with a simple binarization image processing method and by processing the photograph portion of image data with pseudo intermediate tone processing method in processing an document image mixed with a letter and a phtograph.

Image data inputted from an image input device such as an image scanner, a facsimile, a digital copy press, or the like should be transformed and processed into several data formats suited to the condition of the requested object and a peripheral equipment.

In particular, the inputted image data should be binarized in order to output through a binary image output device such as a laser beam printer, a dot matrix printer, or the like.

As aforesaid, there have been conventionally used two as a method for binarizing image data as follows.

The one is a simple binarization processing method which discriminates whether the value of image data read is larger than or smaller than the fixed reference value, thereby simply processing as binary image data of black level or white level ("0" or "1" level).

The other is a psuedo intermediate tone processing method which artifically displays graduation of an original image by controlling the density of a binary pixel in order to reproduce the shading or graduation component of an original image.

The latter is called as a dithering processing method or a half-tone processing method.

Generally, in processing a document image by a simple binarization image processing method, an image of which contrast is extemely clear such as a letter and a line is reproduced as that of better quality. But an image having a graduation component such as a photograph, thus an image of which contrast is not clear is reproduced as that of poorest quality with the exception of the contour (the edge) portion of picture in which graduation is greatly changed.

On the other hand, the phenomenon occurred in processing a document image by a psuedo intermediate tone image processing method is opposed to that in aforesaid simple binarization image processing method.

In other words, in processing a document image by a psuedo intermediate tone image processing method, an image having a graduation component such as a photograph is reproduced as that of better quality. However, an image of which contrast is extemely clear such as a letter or a line is reproduced as that of poorer quality because of discontinuity of a stroke component.

In particular, when an image having a spatial frequency component is reproduced by said image processing method, the Moiré phenomenon that the pattern is generated in the reproduced image is accompanied because of interference beat, so that the picture quality becomes very deteriorated.

As above roughly mentioned, because the prior image input device exclusively adapts either a simple binarization image processing method or a psuedo intermediate tone image processing method, thus because only one of two image processing methods is adapted, the picture quality of an image is entirely deteriorated in binary processing general document image mixed a letter and a photograph.

The techniques for half-tone processing image data is disclosed in more detail in U.S. Pat. Nos. 4,920,501 and 4,958,238.

SUMMARY OF THE INVENTION

It is an object of the invention to provide an image data processing method and apparatus for improving the quality of the reproduced image in reproducing a document image comprising a mixed text portion and photograph portion by a binarization processing method.

To obtain the above object, the present invention adapts a parallel processing method wherein the text portion of a document image is processed by a simple binarization processing method and the photograph portion is processed by a pseudo intermediate tone processing method.

As technique means to obtain the above object, the present invention comprises an A/D converting part for converting an analog image data signal I(x,y) applied from image sensing means into a digital image data signal, a simple binarization processing part for comparing the image data signal applied from said A/D converting part with the designated reference value to transform into the binary image data signal Is(x,y) of black level or white level, a psuedo intermediate tone processing part for comparing said image data signal applied from said A/D converting part with the variable reference value to transform into the binary image data signal Id(x,y) having a gradation component, an image data coordinate system processing part for detecting the window portion of an image and outputting the control signal Cxy corresponding to the window mode select signal WMS, a data selecting part for selecting either said binary image data signal Is(x,y) applied from said simple binarization processing part or said binary image data signal Id(x,y) applied from said pseudo intermediate tone processing part by said control signal Cxy appiled from said image data coordinate system processing part.

The image data coordinate system processing part comprises a main scan direction window coordinate detecting part for detecting main scan direction window coordinates of an image by inputting coordinate data signals, a sub scan direction window coordinate detecting part for detecting sub scan direction window coordinates of an image by inputting said coordinate data signals, first and second gate means of which one input terminal is connected to the output terminal of said main scan direction window coordinate detecting part and other input terminal is connected to the output terminal of said sub scan direction window coordinate detecting part, first and second buffer means being respectively connected to said first and said second gate means and for selecting one of two output signals of said first and second gate means by said window mode select signal WMS, and first inverting means being connected to one of said first and second buffer means and for inverting said window mode select signal WMS.

The main scan direction window coordinate detecting part comprises a first latch for loading the x coordinate value ULx of the window start point among coordinate data signals, a first adder for adding said x coordinate value ULx of the window start point loaded into said first latch and the window width value W among said coordinate data signals, a second latch for loading the output signal of said first adder, a plurality of counters for counting the main scan direction position of pixels related to an image data signal which is simultaneously inputted at the start of the pixel processing mode LEN, a first comparator for comparing the count value appiled from said plurality counters with said x coordinate value ULx of the window start point loaded into said first latch, thereby generating the signal of high level or low level, a second comparator for comparing the value added said x coordinate value ULx of the window start point loaded into said second latch and said window width value W with said count value applied from said plurality counters, thereby generating the signal of high level or low level, a first flip-flop being set or preset by output signals of said first and said second comparators, first inverting means for inverting the pixel processing mode LEN, and a first inverter AND gate for NORing output signals of said first inverting means and said first flip-flop.

The sub scan direction window coordinate detecting part comprises a third latch for loading the y coordinate value ULy of the window start point among coordinate data signals, a second adder for adding the y coordinate value ULy of the window start point loaded into said third latch and window length value L among said coordinate data signals, a fourth latch for loading the output signal of said second adder, a plurality of counters for counting the sub scan direction position of pixels related to an image data signal which is simultaneously inputted at start of the image input mode PEN, a third comparator for comparing the count value applied from said plurality of counters with said y coordinate value ULy of the window start point loaded into said third latch, thereby generating the signal of high level or low level, a fourth comparator for comparing the value added said y coordinate value ULy of the window start point loaded into said fourth latch and said window length value L with said count value appiled from said plurality of counters, thereby generating the signal of high level or low level, a second flip-flop being set or preset by output signals of said third and said fourth comparators, second inverting means for inverting the image input mode signal PEN, and a second inverter AND gate for NORing output signals of said second inverting means and said second flip-flop.

The data selecting part comprises the AND means of which one input terminal is connected to the output terminal of said simple binarization processing part and other input terminal is connected to the output terminal of said image data coordinate system processing part, second inverting means for inverting the output signal of said image data coordinate system processing part and second AND means of which one input terminal is connected to the output terminal of said pseudo intermediate tone processing part and other input terminal is connected to the output terminal of said second inverting means.

BRIEF DESCRIPTION OF THE DRAWINGS

The above and other objects and features of the present invention will become apparent from the following detailed description of the preferred embodiments, taken with reference to the accompanying drawings in which:

FIG. 8 is a diagram illustrating an example of the dither matrix.

DETAILED DESCRIPTION OF THE PREFERRED EMBODIMENTS

The image processing method and apparatus according to the present invention will be described in more detail with reference to the accompanying drawings.

Figure 1:
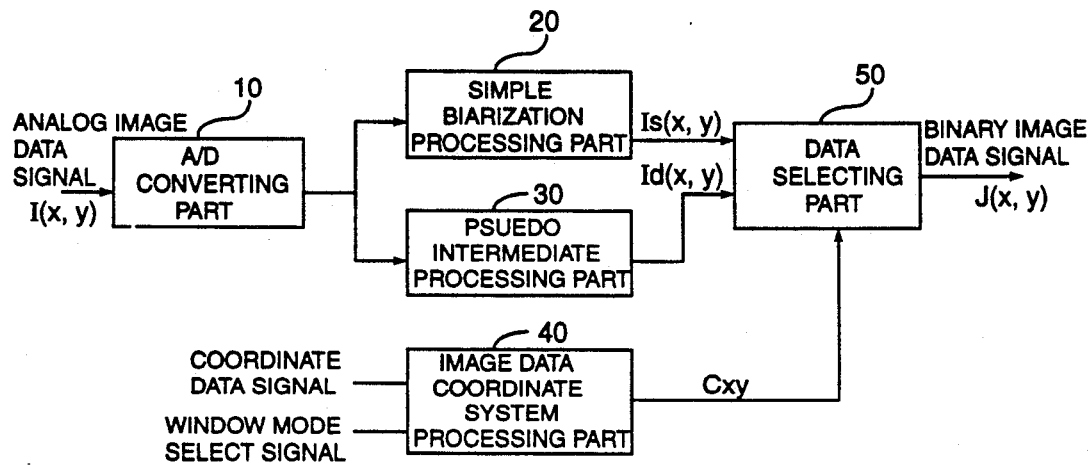
FIG. 1 is a block diagram of an image data processing apparatus with mixture simple binarization and psuedo intermediate tone according to the present invention.

FIG. 1 shows a block diagram of an image processing apparatus with mixture of simple binarization and pseudo intermediate tone according to the present invention.

In FIG. 1, the reference numeral 10 designates the A/D converting part; 20 the simple binarization processing part; 30 the pseudo intermediate tone processing part; 40 the image data coordinate system processing part; and 50 the data selecting part.

The A/D converting part 10 converts analog image data outputted from image sensing means such as a Charge Coupled Device image sensor into digital image data.

The digital image data signal converted through the A/D converting part 10 is simultaneously inputted to the simple binarization processing part 20 and the psuedo intermediate tone processing part 30.

The simple binarization processing part 20 compares the digital image data signal applied from said A/D converting part 10 with the fixed reference value (or the threshold value) and it discriminates as the white pixel level (ex, logical "1" level) when the image data signal is larger than the reference value and otherwise, it discriminates as the black pixel level (ex, logical "0" level).

The psuedo intermediate tone processing part 30 processes the image data signal applied from said A/D converting part 10 corresponding to the designated rule to output the binary image data signal having a gradation component.

Figure 2:
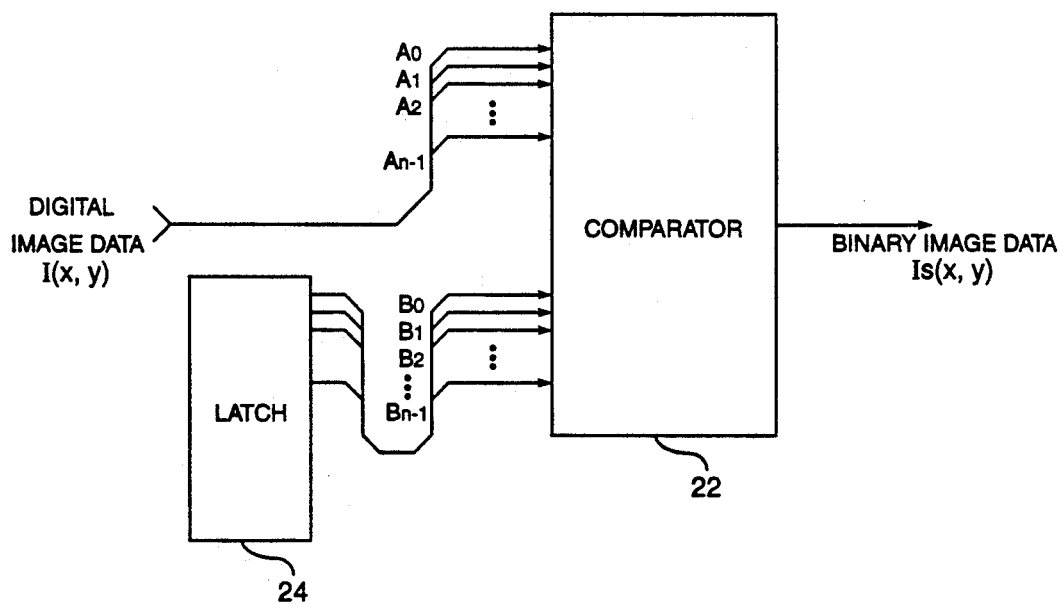
FIG. 2 is a detailed circuit diagram of a simple binarization processing part.
Figure 10:
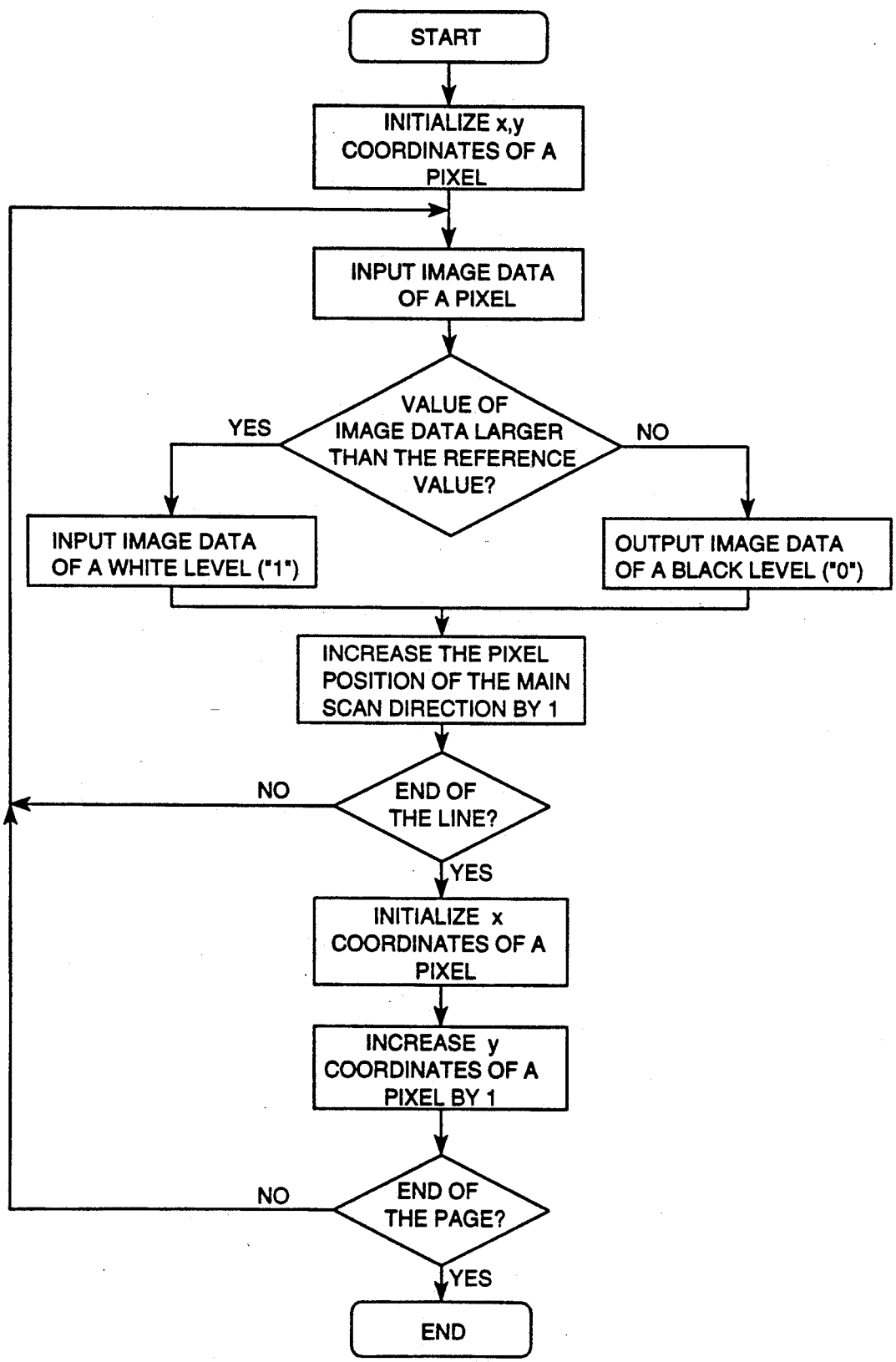
FIG. 10 is a flow chart illustrating a simple binarization processing procedure.

FIG. 2 shows a detailed circuit diagram of the simple binarization processing part 20 and FIG. 10 shows a flow chart illustrating the simple binarization process.

The analog image data signal I(x,y) (Herein, x shows the pixel position of the main scan direction and y shows the pixel position of the sub scan direction, thus a scan line) applied from image sensing means is converted into the digital signal through the A/D converting part 10 and it is inputted to input terminals A0−An−1 of the comparator 22.

Herein, n shows number of bits allocated per a pixel. Thus, if data of 8 bits (n=8) per a pixel, n−1 becomes 7.

Furthermore, the fixed reference value T which is previously predetermined by the latch 24 or a DIP switch, etc., is inputted to other input terminals B0−Bn−1 of the compatarot 22.

The comparator 22 compares image data I(x,Y) inputted with the reference value T and outputs the image data signal Is(x,y) of white level ("1" value) if image data is larger than the reference value T and outputs the image data signal Is(x,y) of black level ("0" level) if image data is smaller than the reference value T.

Subsequently, the simple binarization processing part 20 consecutively reads image data of a pixel of that line and continuously performs aforesaid binarization process until the last pixel position of the main scan direction.

If image data inputted is data of the last pixel of a line, it initializes the x coordinate value of a pixel to 0 and increases the value of y by 1, which shows a scan line of a pixel. Then it reads image data of next line with the same method and performs the binarization process.

When an image of the entire page having a resolution of 2592×3564 is binarized by repeating aforesaid process, it suspends the image data process and waits untill next document is inputted through an image input device.

Figure 3:
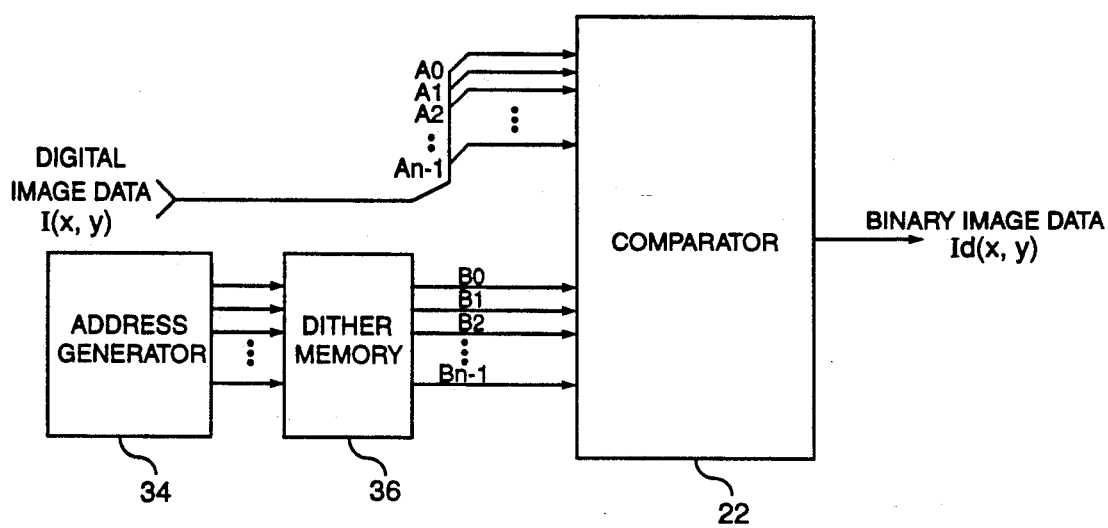
FIG. 3 is a detailed circuit diagram of a pseudo intermediate tone processing part.
Figure 11:
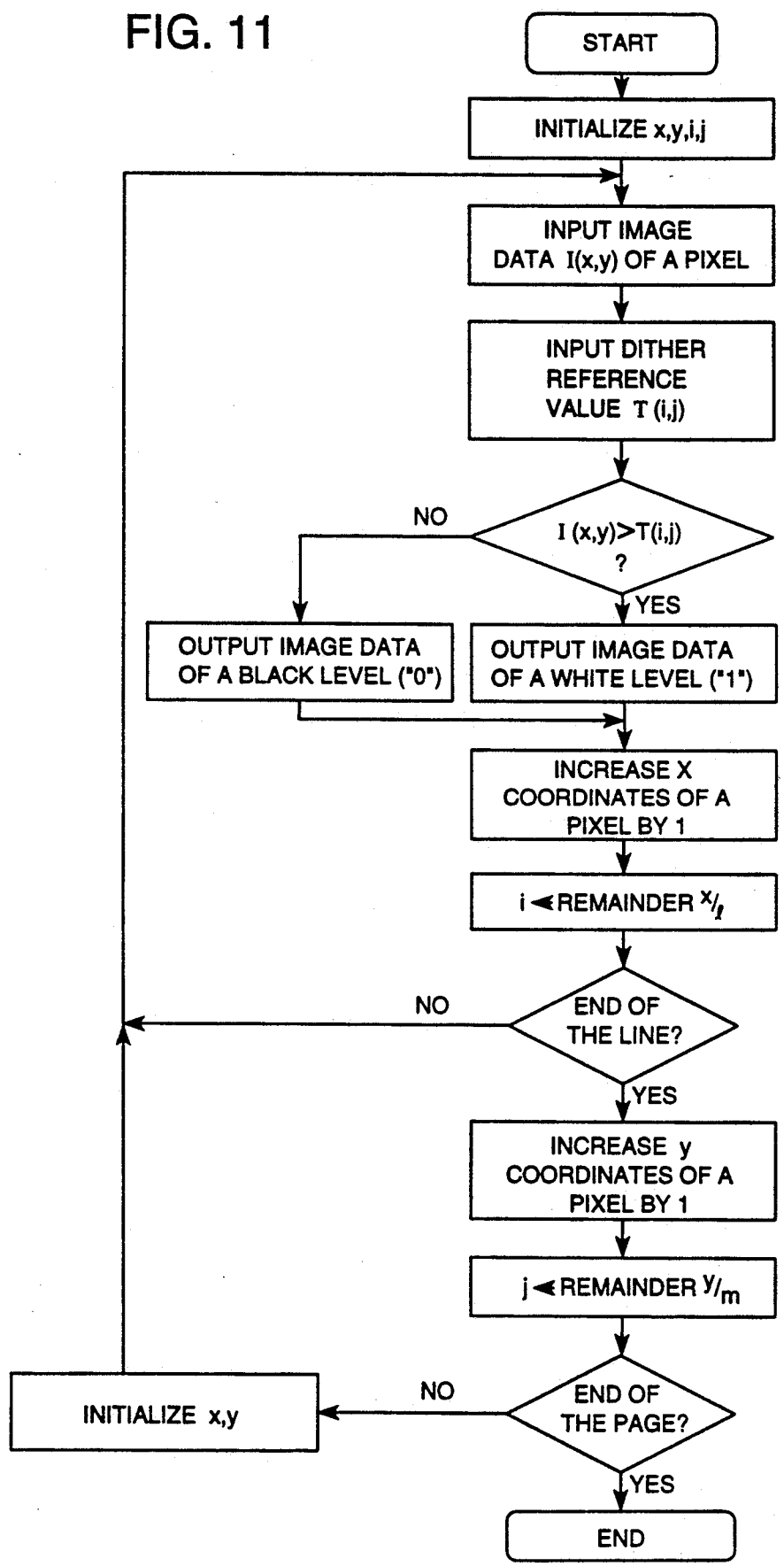
FIG. 11 is a flow chart illustrating a pseudo intermediate tone processing procedure.

FIG. 3 shows a detailed circuit diagram of the pseudo intermediate tone processing part 30 and FIG. 11 shows the flow chart illustrating the pseudo intermediate tone process.

The pseudo intermediate tone image data processing method will be described in more detail with reference to the accompanying FIG. 3 and FIG. 11.

Although the pseudo intermediate tone image data processing method is basically similar to aforesaid the simple binarization image data processing method, the one is different from the other in that the reference value for discriminating black level and white level is varied with reference to the designated rule.

The collection of said variable reference values is called as the dither matrix which conventionally consists of l×m matrix (Refer to FIG. 8). The dither matrix is the square matrix (l=m) and generally, l has values of 4, 8, 16, . . . .

FIG. 8 shows 8×8 dither matrix as an example which is widely used if data of one pixel is 6 bits.

It is a feature of the matrix of FIG. 8 that the sum of all columns has a constant value (256).

The value of said dither matrix is stored into the dither memory 36. The dither memory apply the value of the specific dither matrix to the comparator 32 as the reference value T(i,j) by the address applied from the address generator 34. (Herein, i is a variable corresponding to the row and j is a variable corresponding to the column.)

The comparator 32 performs the same operation as aforesaid comparator 22 of the simple binarization processing part 20 of FIG. 2. Therefore, it converts image data I(x,y) inputted into the binary image data signal Id(x,y).

To briefly describe the present invention, because it is supposed that the dimension of the dither matrix is 8×8, i.e. m=8, in the case where image data is processed in the main scan direction of a pixel or the sub scan direction (scan line) of a pixel, the value of the dither matrix used for the variable reference value is repeated with the period of 8.

Concretely speaking, if the reference value for the binarization process is T(i,j), i and j is repeated with the period of 8 of from 0 to 7.

Therefore, the reference value of the first scan line is repeated in the order of 0, 32, 8, 40, 2, 34, 10, 42, 0, 32, 8, . . . and that of the second scan line is repeated in the order of 48, 16, 56, 24, 50, 18, 58, 26, . . . (Refer to FIG. 8).

According to the increase of the scan line, the row of the dither matrix is also repeated with the period of 8 as above-mentioned.

The address generator 34 as means for selecting said dither matrix repeatedly operates in accordance with the dimension (l×m) of the designated dither matrix.

The digital image data I(x,y) applied from the A/D converting part 10 is simultaneously processed through the simple binarization processing circuit as shown in FIG. 2 and the pseudo intermediate tone processing circuit as shown in FIG. 3.

Said respectively processed image data is processed as combined mode data in the data selecting part 50 by the control signal Cxy outputted from the image data coordinate system processing part 40 of FIG. 1.

The image data coordinate system processing part 40 is means for extracting the window portion to be processed with simple binarization and pseudo intermediate tone. If the window portion of a document is processed with pseudo intermediate tone, the background with the exception of the window portion is processed with simple binarization and on the contrary, if the window portion is processed with simple binarization, the background is processed with pseudo intermediated tone.

Therefore, it is demanded to detect window coordinates of the main scan direction and window coordinates of the sub scan (scan line) window direction, i.e. the tow-dimensional coordinates.

Figure 4:
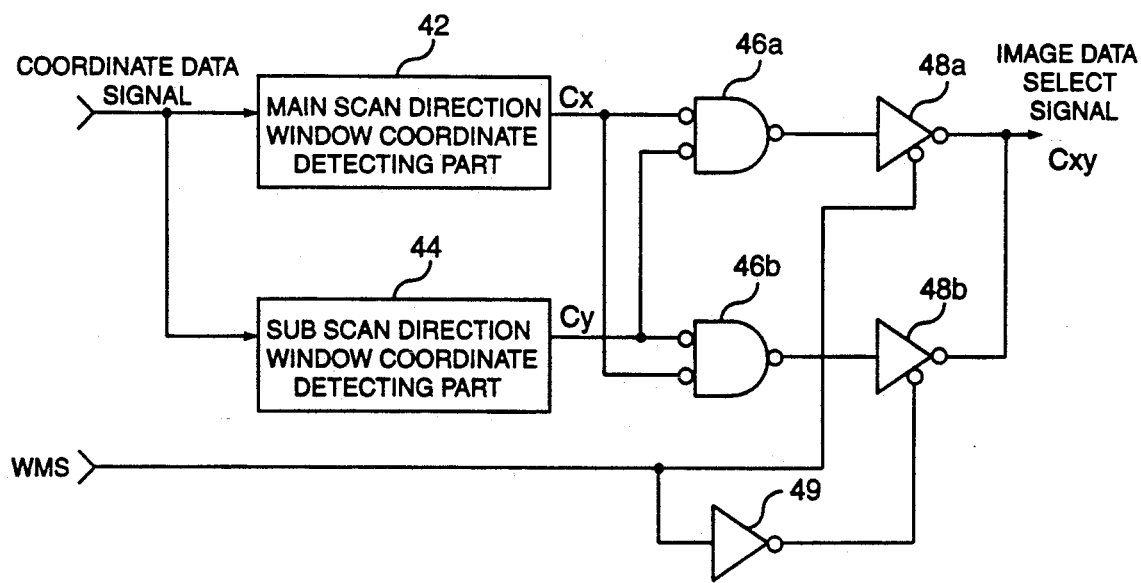
FIG. 4 is a circuit diagram of an image data coordinate system processing part.

FIG. 4 shows a circuit diagram of the image data coordinate system processing part 40.

In FIG. 4, the reference numeral 42 denotes the main scan direction window coordinate detecting part and 44 denotes the sub scan direction window coordinate detecting part.

First, the image data coordinate system processing part will be roughly described with reference to the accompanying FIG. 4.

When a document having a size of A4 paper is inputted to an image input device, an image input device conventionally disintegrates the document image into minute pixels of 2592×3564, thereby inputting them. At this time, number of pixels per 1 inch is on the order of about 300 dots per 1 inch (DPI).

Before an image output device perfectly decodes the image into 300 DPI, it preview-scans an image on the order of about 75 DPI in order to obtain the information for the image (a letter or a photograph) of the inputted document. At this time, coordinate data of the window (Refer to FIG. 4) is inputted through a mouse or a keyboard, or the like by using an image editing apparatus and, to the contrary, it is able to be automatically inputted by discriminating text (letter area) and graphic (photograph).

Coordiante data is the data signal indicative of two-dimentional coordinate value (ULx,ULy) of the window start point, the window width W and the window length L.

The WMS signal as shown in FIG. 4 is the window mode select signal for determining whether the determined window portion is processed with simple binarization or with psuedo intermediate tone.

Figure 5:
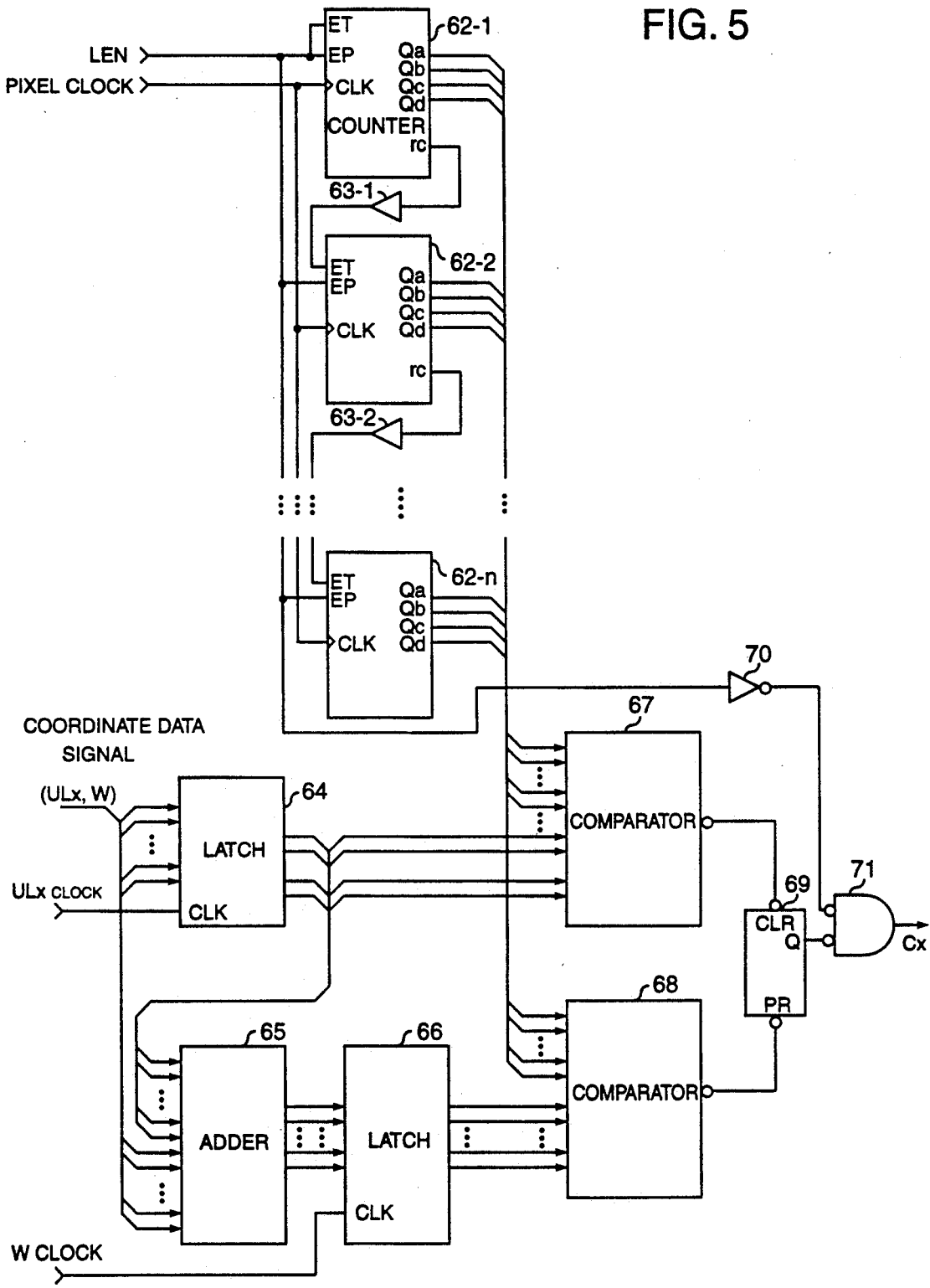
FIG. 5 is a detailed circuit diagram of a main scan direction window coordinate detecting part.
Figure 6:
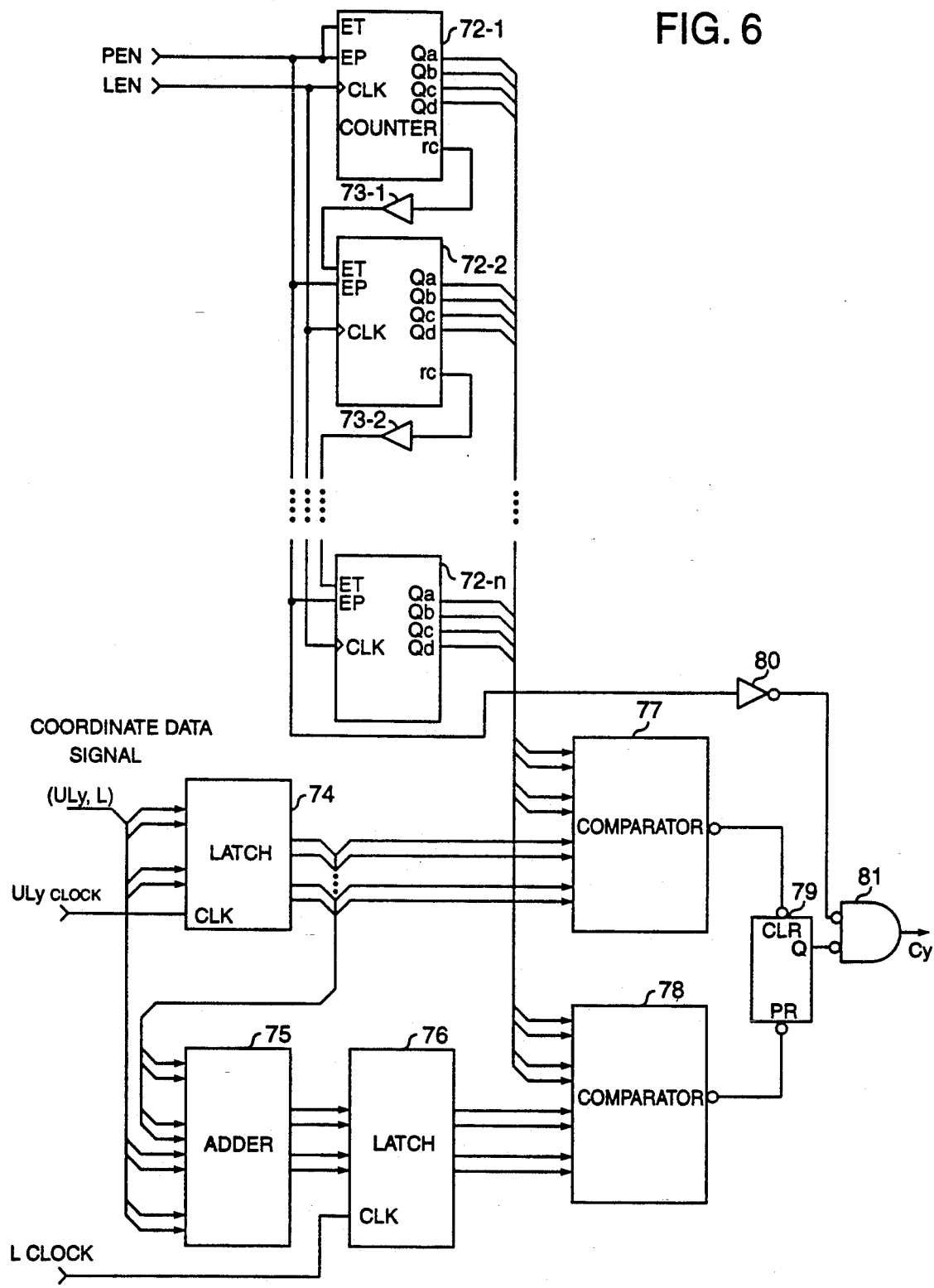
FIG. 6 is a detailed circuit diagram of a sub scan direction window coordinate detecting part.

FIG. 5 shows a detailed circuit diagram of the main scan direction window coordinate detecting part 42 of FIG. 4 and FIG. 6 shows a detailed circuit diagram of the sub scan direction coordiante detecting part 44 of FIG. 4.

Hereinbelow, the image data coordinate system processing part 40 will be described in more detail with reference to the accompanying FIG. 5 and FIG. 6.

In the case where the main scan direction window coordinate detecting circuit of FIG. 5 selects and outputs image data applied from the pseudo intermediate tone processing part 30 against the detected window portion and image data applied from the simple binarization processing part 20 against the background portion by the window processing mode, thus in the case where the window mode select signal WMS is "0" level, the x coordinate value ULx of the window start point among coordinate data is loaded into the latch 64 by synchronizing with the ULx clock under the preview scan.

Furthermore, under said preview scan, the adder 65 sums up the x coordinate value ULx of the window start point loaded into the latch 64 and the window width W among coordinate data.

After the x coordinate value of the window start point and the window width is summed up, the output of said adder 65 is loaded into the latch 66 by synchronizing with the W clock.

Under aforesaid conditions, if the image processing mode signal LEN is inputted, a plurality of counters 62-1 through 62-n which operate by synchronizing with the pixel clock counts number of pixels of the main scan direction.

In other words, a plurality of counters 62-1 through 62-n make the pixel position of the main scan direction related to the image data signal processed.

The comparator 67 compares output of said counters with the x coordinate value ULx of the window start point stored into the latch 64. At this time, if two values are equal, thus if the ULxth pixel is detected, the x coordinate detecting signal Cx becomes logic "0" state.

Besides, the comparator 68 compares the coordinate value ULx+W applied from the latch 66 with output of counters which is continuously applied. If the value ULx+W is equal to output of counters, the x coordinate detecting signal Cx is inverted into logic "1" state (Refer to FIG. 9).

FIG. 6 is a detailed circuit diagram of the sub scan direction window coordinate detecting part.

The operation principle of the sub scan direction window coordinate detecting circuit is identical with that of said main scan direction window coordinate detecting circuit.

In the case where the window mode select signal WMS is "0" level, thus in the case where the window portion of the image is processed with pseudo intermediate tone and the background portion is preocessed with simple binarization, the y coordinate value ULy of the window start point among coordinate data is loaded into the latch 74 by synchronizing with the ULy clock under the preview scan.

Besides, under the preview scan, the adder 75 sums up the y coordinate value ULy of the window start point stored into the latch 74 and the window length L among coordinate data. The sum of the y coordinate value of the window start point and the window length is loaded into the latch 76 by synchronizing with the L clock.

Under this conditions, if the image input mode signal PEN is inputted, a plurality of counters 72-1 through 72-n counts the pixel position of the sub scan direction i.e. a scan line by synchronizing with the the image processing mode signal LEN.

The comparator 77 compares the count value appiled from counters 72-1 through 72-n with the y coordinate value ULy of the window start point applied from the latch 74. If two values are equal, thus if the ULyth pixel position is detected, the y coordinate detecting signal Cy becomes logic "0" state.

Besides, the comparator 78 compares the coordinate value ULy+L applied from the latch 76 with the count value applied from counters 72-1 through 72-n. If the value ULy+L is equal to the output of counters, the y coordinate detecting signal Cy becomes inverted into logic "1" state.

As above-mentioned, the x and y coordinate detecting signal Cx and Cy of the window detected from the main scan direction window coordinate detecting circuit and the sub scan direction window coordinate detecting circuit are appiled to gates 46a and 46b of FIG. 4.

The signals applied from gates 46a and 46b are selected through 3-state buffers 48a and 48b by the logic state of the window mode select signal WMS, thereby generating the image data select signal Cxy.

Figure 7:
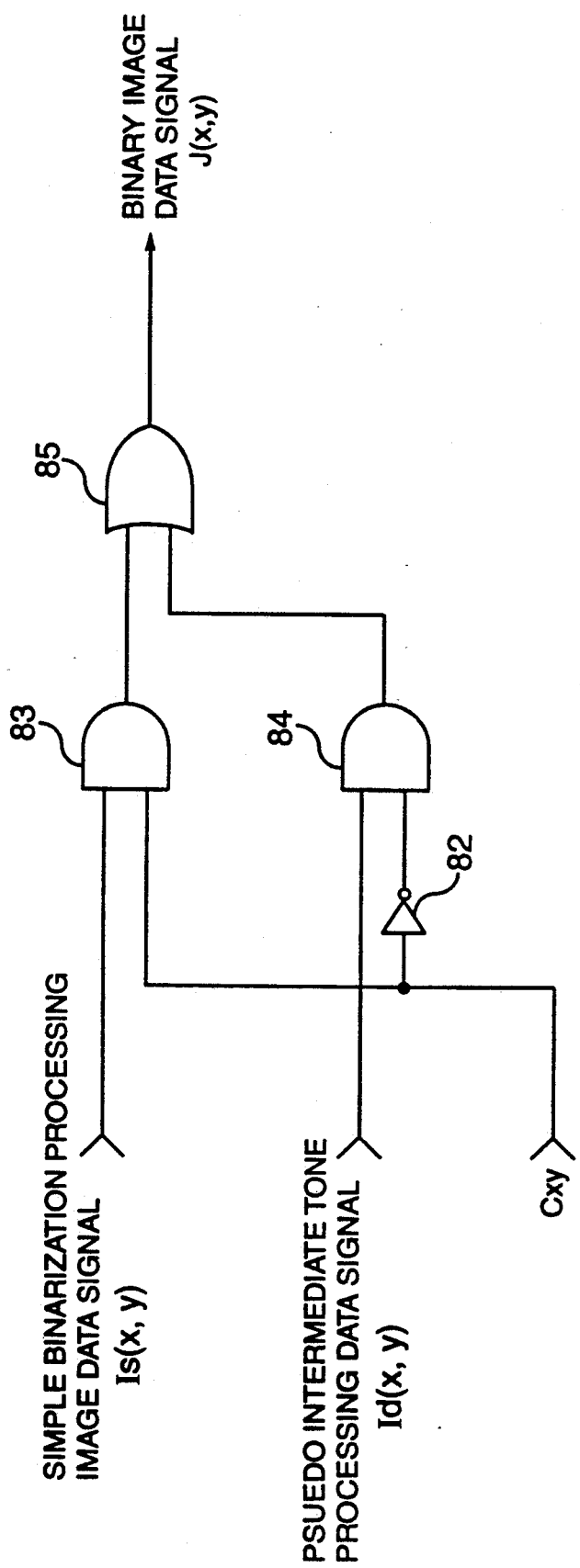
FIG. 7 is a detailed circuit diagram of a data selecting part.

FIG. 7 shows a circuit diagram of the data selecting part.

If the image data select signal Cxy applied from the image data coordinate system processing circuit of FIG. 4 is logic "1" state, the image data signal Is(x,y) applied from the simple binarization processing part 20 of FIG. 1 is selected.

If the image data select signal Cxy is logic "0" state, the image data signal Id(x,y) applied from the pseudo intermediate tone processing part 30 of FIG. 1 is selected.

Hereinbelow, the combined processing method of the present invention will be described in more detail with reference to the accompanying FIG. 1 and FIG. 12 by synthesizing the aforesaid description.

Figure 12:
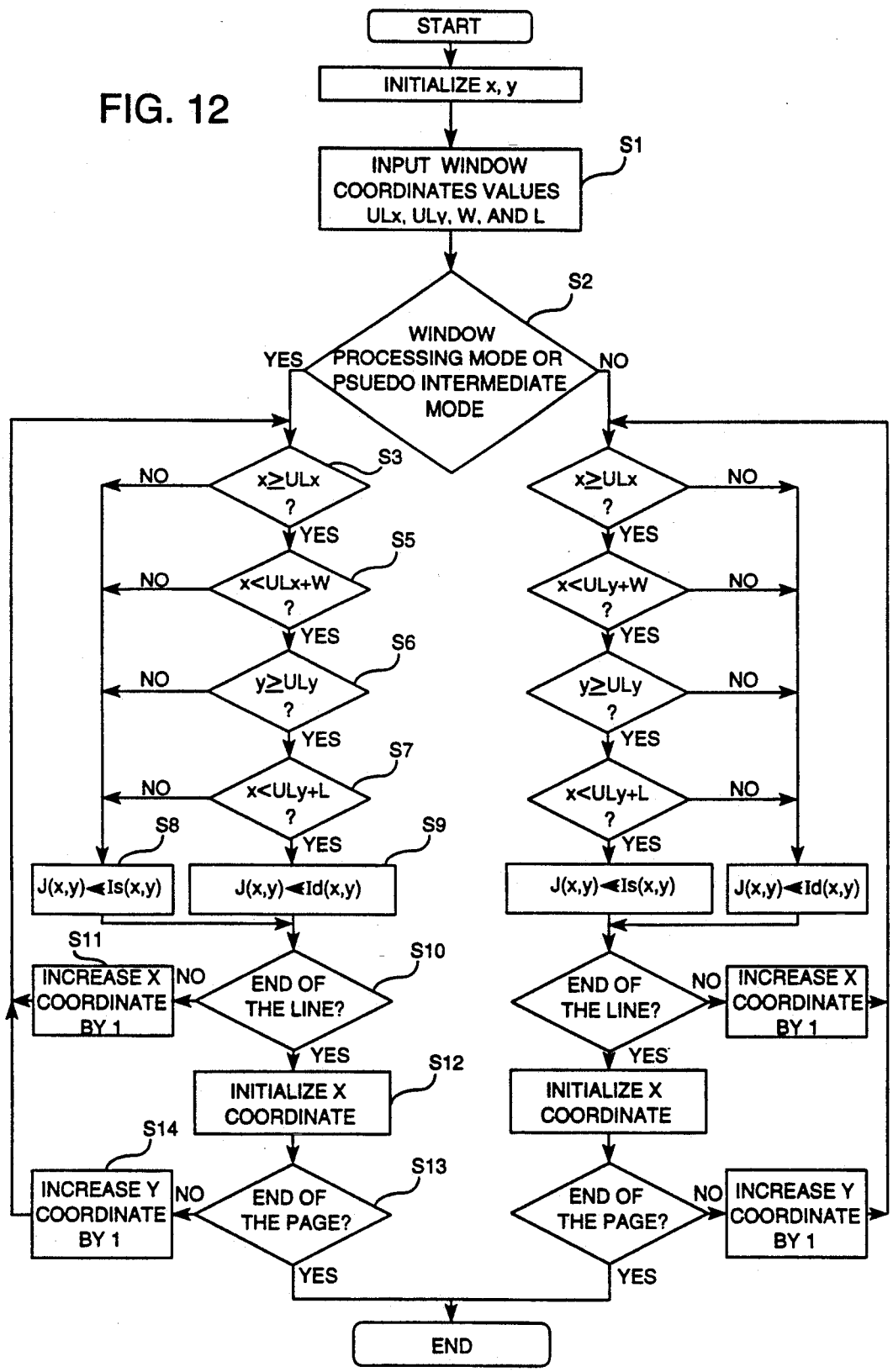
FIG. 12 is a flow chart illustrating an image data processing method of the present invention.

FIG. 12 show a flow chart illustrating combined processing method of the present invention.

In the preview scan, coordiante data signals ULx, ULy, W and L, which determines the window portion of the document image mixed with a letter and a photograph, are inputted to the image data coordinate system processing part 40 to determine the window; S1

The image data coordinate system processing part 40 discriminate whether the window processing mode is the pseudo intermediate tone processing mode or not; S2

If the window processing mode is the pseudo intermediate tone processing mode, thus if "Yes", it discriminates whether the value of x (main scan direction coordinates of the pixel) of the inputted image data I(x,y) is larger than the x coordinate value ULx of the window start point or not; S3

If the value of x is smaller than that of ULx, thus if "No", it selects and outputs image data Is(x,y) processed through the simple binarization processing part 20.

To the contrary, if the value of x is larger than that of ULx, thus if "Yes", it discriminates whether the value of x is smaller than that of ULx+W (window width) or not; S5

If the value of x is larger than that of ULx+W, thus if "No", it selects image data Is(x,y) processed through the simple binarization processing part 20. If the value of x is smaller than that of ULx+W, thus if "Yes", it discriminates whether the value of y (sub scan direction coordinates of a pixel) is larger than the y coordinate value ULy of the window start point or not; S6

In step S6, if "Yes", it discriminates whether the value of y is smaller than that of ULy+L (window length) or not and if "No", it executes the step S8. If the value of y is smaller than that of ULy+L, it selects and outputs image data Id(x,y) processed through the pseudo intermediate tone processing part 30; S9

Figure 9:
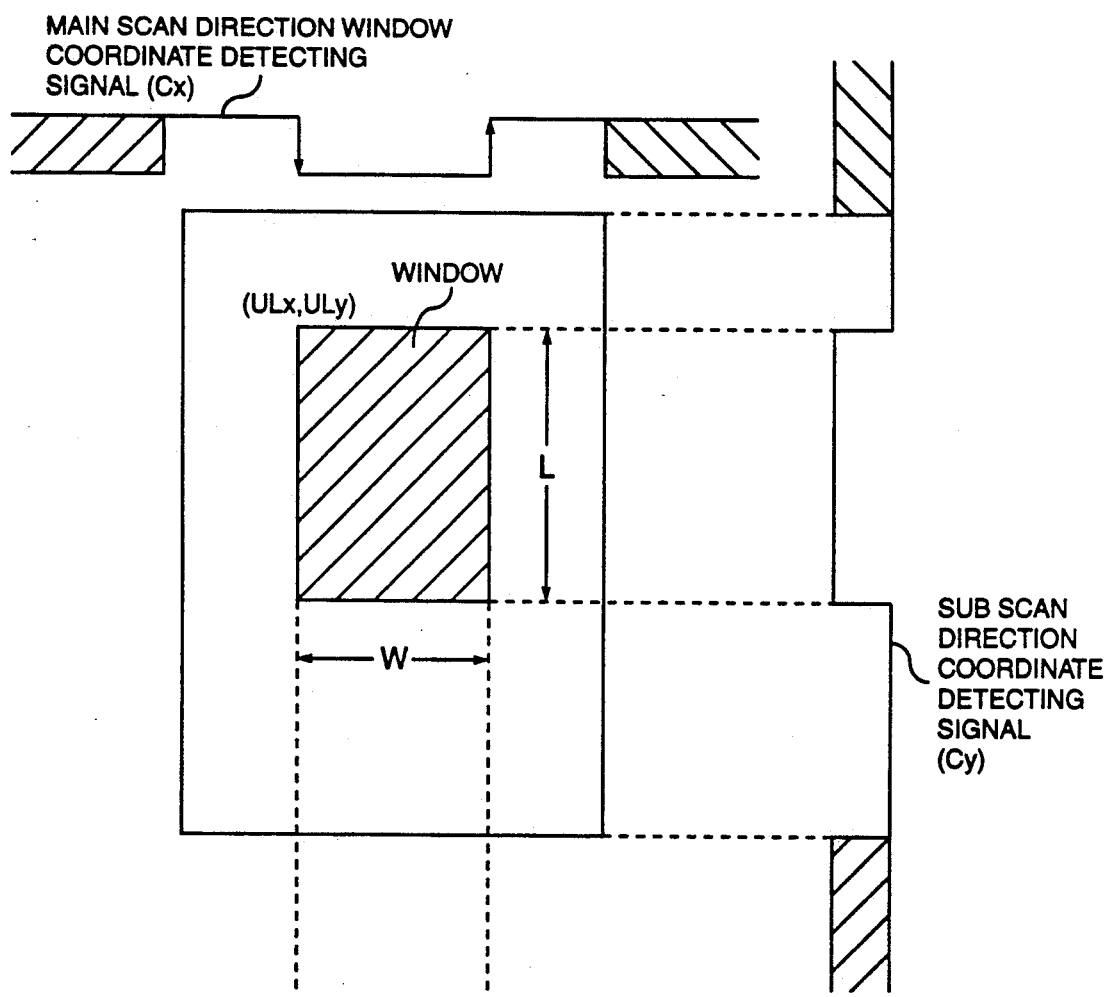
FIG. 9 is a diagram illustrating a method for detecting window coordinates.

In brief on afresaid step S3 through step S9, if the pixel related to inputted image data I(x,y) belongs to the window portion as shown in FIG. 9 (ULx≦x≦ULx+W, ULy≦y≦ULy+L), it selects and outputs image data Id(x,y) processed through the pseudo intermediate tone processing part 30 and if the pixel belongs to the background portion with the exception of the window, it selects and outputs image data Is(x,y) processed through the simple binarization processing part 20.

Subsequently, it discriminates whether the pixel which is related to the selected image data is the last pixel of the line or not; S10

If not the pixel of the end position of the line, it increase the value of x by 1 and returns to the step S3 in order to process image data of next pixel; S11

If the position of the pixel which is related to the image data signal processed is the end of the line, it initializes the value of x to "0" and then discriminates whether the position of the pixel is the end of the page (1 image) or not; S12 and S13

If no the end of the page, it increases the value of y and returns to the step S3 in order to process the image related to a pixel of next line; S14

If the end of page, the process of 1 image is finished and it suspends the data process and waits until next instruction.

In the case where the window processing mode is not the psuedo intermediate tone processing mode, thus in the case where it is the simple binarization processing mode ("No" in the step S2), the process which is contrary to aforesaid image data selecting process is executed.

In the case where the pixel related to inputted image data signal I(x,y) belongs to the window portion, it selects and outputs the image data signal Is(x,y) processed through the simple binarization processing part 20 and on the contrary in the case where the pixel belongs to the background portion, it selects and outputs the image data signal Id(x,y) processed through the pseudo intermediate tone processing part 30.

As above-mentioned, the present invention processes the image of the letter portion with the simple binarization processing method and on the contrary it processes the image of the photograph portion with the pseudo intermediate tone processing method, thereby entirely improving the picture quality of the reproduced image.

While the invention has been particularly shown and described herein with reference to preferred and other embodiments thereof, it will be understood by those skilled in the art that various modifications and changes may be made to the instant invention utilizing the principles of the invention as described herein without departing from the spirit and scope thereof as encompassed in the accompanying claims. Therefore, it is intended in the accompanying claims to cover all such equivalent variations as come within the scope of the invention as described.

What is claimed is:

1. An image data processing apparatus with a mixture of simple binarization and pseudo intermediate tone, comprising:

(a) an A/D converting part (10) for converting an analog image data signal I(x,y) applied from image sensing means into a digital image data signal;

(b) a simple binarization processing part (20) for comparing the image data signal applied from said A/D converting part (10) with a designated reference value to transform said image data signal applied from said A/D converting part (10) into a binary image data signal Is(x,y) of black level or white level;

(c) a pseudo intermediate tone processing part (30) for comparing said image data signal applied from said A/D converting part (10) with a variable reference value to transform said image data signal applied from said A/D converting part (10) into a binary image data signal Id(x,y) having a gradation component;

(d) an image data coordinate system processing part (40) for detecting a window portion of an image and outputting a control signal Cxy corresponding to a window mode select signal WMS, said image data coordinate system processing part (40) comprising:

(i) a main scan direction window coordinate detecting part (42) for detecting main scan direction window coordinates of an image by inputting coordiante data signals;

(ii) a sub scan direction window coordinate detecting part (44) for detecting sub scan direction window coordinates of an image by inputting said coordinate data signals;

(iii) first and second gate means (46a) and (46b) of which one input terminal is connected to an output terminal of said main scan direction window coordinate detecting part (42) and another input terminal is connected to an output terminal of said sub scan direction window coordinate detecting part (44);

(iv) first and second buffer means (48a) and (48b) being respectively connected to said first and said second gate means (46a) and (46b) and for selecting one of two output signals of said first and second gate means (46a) and (46b) by said window mode select signal WMS; and (v) first inverting means (49) being connected to one of said first and second buffer means (48a) and (48b) and for inverting said window mode select signal WMS;

and (e) a data selecting part (50) for selecting either said binary image data signal Is(x,y) applied from said simple binarization processing part (20) or said binary image data signal Id(x,y) applied from said pseudo intermediate tone processing part (30) by said control signal Cxy applied from said image data coordinate processing part (40), said data selecting part (50) comprising:

(vi) first AND means (83) of which one input terminal is connected to an output terminal of said simple binarization processing part 20 and another input terminal is connected to an output terminal of said image data coordinate system processing part (40);

(vii) second inverting means (82) for inverting the output signal of said image data coordinate system processing part (40); and (viii) second AND means of which one input terminal is connected to an output terminal of said pseudo intermediate tone processing part (30) and another input terminal is connected to an output terminal of said second inverting means (82).

2. An image data processing apparatus with a mixture of simple binarization and pseudo intermediate tone according to claim 1 wherein said main scan direction window coordinate detecting part (42) comprises:

a first latch (64) for loading an x coordinate value ULx of the window start point among coordinate data signals;

a first adder (65) for adding said x coordinate value ULx of the window start point loaded into said first latch and a window width value W among said coordinate data signals;

a second latch (66) for storing the output signal of said first adder 65;

a plurality of counters (62-1) through (62-n) for counting the main scan direction position of pixels related to an image data signal which is simultaneously inputted at the start of a pixel processing mode LEN;

a first comparator (67) for comparing the count value applied from said plurality of counters (62-1) through (62-n) with said x coordinate value ULx of the window starting point loaded into said first latch (64), thereby generating the signal of high level or low level;

a second comparator (68) for comparing a value output from said second latch (66) which is the sum of said x coordinate value ULx of the window start point loaded into said first latch (64) and said window width value W, with said count value applied from said plurality of counters (62-1) through (62-n), thereby generating the signal of high level or low level;

a first flip-flop (69) being set or preset by output signals of said first and said second comparators (67) and (68);

first inverting means (70) for inverting the pixel processing mode LEN; and a first inverter AND gate (77) for NORing output signals of said first inverting means (70) and said first flip-flop (69).

3. An image data processing apparatus with a mixture of simple binarization and pseudo intermediate tone according to claim 1, wherein said sub scan direction window coordinate system detecting part 44 comprises:

a third latch (74) for loading a y coordinate value ULy of the window start point among coordinate data signals;

a second adder (75) for adding said y coordinate value ULy of the window start point loaded into said third latch (74) and a window length value L among said coordinate data signals;

a fourth latch (76) for loading the output signal of said second adder (75);

a plurality of counters (72-1) through (72-n) for counting the sub scan direction position of pixels related to an image data signal which is simultaneously inputted at the start of an image input mode PEN;

a third comparator (77) for comparing the count value applied from said plurality of counters (72-1) through (72-n) with said y coordinate value ULy of the window start point loaded into said third latch (74), thereby generating the signal of high level or low level;

a fourth comparator (78) for comparing a value output from said fourth latch (76), which is the sum of said y coordinate value ULy of the window start point loaded into said third latch (74) and said window length value L, with said count value appiled from said plurality of counters (72-1) through (72-n), thereby generating the signal of high level or low level;

a second flip-flop (79) being set or preset by output signals of said third and said fourth comparators (77) and (78);

second inverting means (80) for inverting the image input mode signal PEN; and a second inverter AND gate (81) for NORing output signals of said second inverting means (80) and said second flip-flop (79).

* * * * *